United States Patent
Honda et al.

(10) Patent No.: US 8,258,403 B2
(45) Date of Patent: Sep. 4, 2012

(54) INSULATION COATING FOR ELECTRIC WIRES AND ELECTRIC INSULATED WIRE USING SAME

(75) Inventors: Yuki Honda, Hitachi (JP); Tomiya Abe, Hitachi (JP); Hideyuki Kikuchi, Hitachi (JP)

(73) Assignees: Hitachi Cable, Ltd., Tokyo (JP); Hitachi Magnet Wire Corp., Ibaraki (JP)

( * ) Notice: Subject to any disclaimer, the term of this patent is extended or adjusted under 35 U.S.C. 154(b) by 467 days.

(21) Appl. No.: 12/534,932

(22) Filed: Aug. 4, 2009

(65) Prior Publication Data

US 2010/0032184 A1   Feb. 11, 2010

(30) Foreign Application Priority Data

Aug. 5, 2008   (JP) .................................. 2008-201752

(51) Int. Cl.
*H01B 7/00* (2006.01)

(52) U.S. Cl. ................................................. 174/110 R

(58) Field of Classification Search ............. 174/110 R, 174/113 R, 120 R, 120 SC, 121 R, 122 R
See application file for complete search history.

(56) References Cited

U.S. PATENT DOCUMENTS

| | | | | |
|---|---|---|---|---|
| 4,694,040 | A | * | 9/1987 | Hashimoto et al. ........... 524/765 |
| 6,063,898 | A | * | 5/2000 | Endo et al. ..................... 528/411 |
| 6,239,376 | B1 | * | 5/2001 | Kimura et al. ............ 174/110 R |
| 6,811,875 | B2 | * | 11/2004 | Kikuchi et al. ................ 428/372 |
| 7,001,970 | B2 | * | 2/2006 | Studer et al. ..................... 528/26 |
| 7,253,357 | B2 | * | 8/2007 | Cipelli et al. .................... 174/36 |
| 2001/0018981 | A1 | * | 9/2001 | Yin et al. .................. 174/120 R |
| 2004/0200636 | A1 | * | 10/2004 | Hirai et al. ................ 174/120 R |
| 2006/0029811 | A1 | * | 2/2006 | Sugioka et al. ............... 428/413 |
| 2007/0151743 | A1 | * | 7/2007 | Murray et al. ............ 174/110 R |

FOREIGN PATENT DOCUMENTS

| | | |
|---|---|---|
| JP | 05-130759 | 5/1993 |
| JP | 10-231425 | 9/1998 |
| JP | 10-289622 | 10/1998 |
| JP | 2001-031764 | 2/2001 |
| JP | 2002-056720 | 2/2002 |
| JP | 2003-016846 | 1/2003 |

* cited by examiner

*Primary Examiner* — William Mayo, III
(74) *Attorney, Agent, or Firm* — Antonelli, Terry, Stout & Kraus, LLP.

(57) ABSTRACT

An insulation coating for electric wires has a resin coating made from polyimide resin or polyamide-imide resin as a constituent resin, the insulation coating being formed by dispersing phenyl trialkoxysilane and pure water in the resin coating. The phenyl trialkoxysilane is included 3 to 100 parts by weight for the constituent resin of 100 parts by weight in the resin coating.

6 Claims, No Drawings

INSULATION COATING FOR ELECTRIC WIRES AND ELECTRIC INSULATED WIRE USING SAME

CLAIM OF PRIORITY

The present application claims priority from Japanese patent application serial no. 2008-201752 filed on Aug. 5, 2008, the content of which is hereby incorporated by reference into this application.

BACKGROUND OF THE INVENTION

1. Field of the Invention

The present invention relates to an electric insulated wire used to form a coil in a motor, a transformer, or another electric unit and relates to an insulation coating for electric wires used to form an insulation film of the electric insulated wire.

2. Description of Related Art

An enameled wire, which is one type of electric insulated wire, is formed by applying an insulation coating for electric wires to an electric conductor and by baking the coating to form an insulation film. Coils used in electric units are formed by winding enameled wires of this type; these coils are widely put into practical use as magnet wires for large-capacity, large-sized heavy electric units. As recent electric units have been made compact and their performance has been improved, these units are being controlled by high-voltage inverters.

When these enameled wires are used in the manufacturing of electric units such as, for example, motors and transformers, the enameled wires, in general, have been mainly wound continuously in a coiled shape along slots in the cores of the motors. In another main method, the enameled wires have been wound in a coiled shape and then fitted to and inserted into the slots in the cores.

In a method proposed for an enameled wire having a large cross sectional area, that is, a large outer diameter or for an enameled wire having a rectangular electric conductor, a plurality of short, small-diameter coils with a small number of turns are formed by winding enameled wires and the ends of the enameled wires of each small-diameter coil are welded to those of the adjacent coils to form a long coil, instead of forming a long coil with a large number of turns by continuously winding an enameled wire. Coils formed in this way are used in small electric units that need high-density magnetic fluxes, such as, e.g., electric generators in automobiles.

The main exemplary enameled wires used to form coils in electric generators in automobiles are double-coated enameled wires having a polyamide-imide insulation film around a polyester imide insulation film formed around an electric conductor. Other main examples are single-coated enameled wires having a polyamide-imide insulation film formed around an electric conductor. Some other enameled wires are double-coated enameled wires having a polyamide-imide insulation film around a polyimide insulation film formed around an electric conductor to improve both heat resistance and mechanical strength (see, e.g., JP-A Hei 5(1993)-130759).

In control by an inverter, a high surge voltage generated by the inverter may enter a motor and thereby a motor insulation system may be affected. If inadequate insulation is provided between enameled wires wound in a coiled shape, deterioration of the insulation layers is accelerated by corona discharges. When a voltage at which a corona discharge starts to occur on the insulation film is higher than the surge voltage caused by the inverter, no corona discharge occurs, prolonging the life of the insulation film. To increase the voltage at which a corona discharge occurs, the insulation film may be thickened or may have a low dielectric constant. However, a thick insulation film is not preferable since it largely affects the motor design from the viewpoint of the conductor fill factor. In a known example of reducing the dielectric constant, an insulation coating for electric wires obtained by dissolving a phenol compound in aromatic polyester resin is applied to an electric conductor and baked to cover the electric conductor with an insulation film; the resulting enameled wire has a low water absorption ratio and superior dielectric characteristics (see, e.g., JP-A-2003-16846).

It is also proposed that an insulation coating for electric wires produced from fluorine-based polyimide resin is applied to the surface of an electric conductor and baked (see, e.g., JP-A-2002-56720). JP-A-Hei 10(1998)-289622 discloses a polyimide-silica hybrid electric insulated wire obtained by applying a modified polyimide precursor solution to an electric conductor and by baking the precursor, the modified polyimide precursor solution being prepared by dissolving tetraalkoxysilane and pure water in a polyimide precursor solution.

Although a low dielectric constant can be achieved by the methods described above, a toxic fluorine gas is given off during baking at a high temperature. Another problem is that since a float occurs between the electric conductor and the insulation film due to an inadequate adhesion between them, a dielectric breakdown occurs even when a low voltage is applied.

Enameled wires having an insulation film made of polyamide-imide and enameled wires having an insulation film made of polyimide are classified into a high continuous heat resistance class, i.e., a 180° C.-220° C. class, so these enameled wires are widely used as heat-resistant enameled wires. Although polyamide-imide and polyimide are highly heat resistant, they have high dielectric constants and dielectric dissipation factors due to their high polarity.

SUMMARY OF THE INVENTION

Under these circumstances in order to address the above problems in the prior art, it is an objective of the present invention to provide an insulation coating for electric wires which is superior in suppressing corona discharge generation while maintaining heat resistance and adhesion and also to provide an electric insulated wire to which the insulation coating is applied.

According to one aspect of the present invention, there is provided an insulation coating for electric wires comprising a resin coating made from polyimide resin or polyamide-imide resin as a constituent resin, the insulation coating being formed by dispersing phenyl trialkoxysilane and pure water in the resin coating; the phenyl trialkoxysilane is included 3 to 100 parts by weight for the constituent resin of 100 parts by weight in the resin coating.

In the above aspect of the present invention, the following modifications and changes can be made.

(i) The phenyl trialkoxysilane described above is phenyl triethoxysilane or phenyl trimethoxysilane.

(ii) An electric insulated wire comprises an electric conductor and an insulation film in which the insulation film is formed by applying the insulation coating for electric wires described above to the electric conductor directly or through an insulation layer made from another organic insulation coating and by baking the insulation coating.

(iii) The insulation film of the electric insulated wire is formed on a film comprising a silane coupling agent preformed on the electric conductor.

ADVANTAGES OF THE INVENTION

The present invention can provide an insulation coating for electric wires which is superior in suppressing corona discharge generation while maintaining heat resistance and adhesion to an electric conductor. The present invention can also provide an electric insulated wire to which the insulation coating is applied. The electric insulated wire is preferable particularly for coils in motors and transformers.

DETAILED DESCRIPTION OF THE PREFERRED EMBODIMENTS

A preferred embodiment of the present invention will be described in detail below. However, the present invention is not limited to the embodiments described herein.

The inventors of the present invention carried out a diligent study in order to obtain an electric insulated wire which is superior in suppressing corona discharge generation while maintaining heat resistance and adhesion and is preferable particularly for coils in motors and transformers. The inventors found that such an electric insulated wire can be achieved by applying an insulation coating for electric wires to an electric conductor directly or through an insulation layer made from another organic insulation coating and by baking the insulation coating, the insulation coating comprising a resin coating made from polyimide resin or polyamide-imide resin as a constituent resin, the insulation coating being obtained by dispersing phenyl trialkoxysilane and pure water in the resin coating, the phenyl trialkoxysilane being included 3 to 100 parts by weight for the constituent resin of 100 parts by weight in the resin coating, which led to the present invention.

The present invention can provide an electric insulated wire which achieves high adhesion between an insulation film and an electric conductor and has a low dielectric constant, while the electric insulated wire is superior in suppression of corona discharge generation and dielectric breakdown prevention characteristics, and is preferable for use as coils particularly in motors and transformers.

(Insulation Coating for Electric Wires)

The resin coating comprises a constituent resin and a solvent. The constituent resin of resin coating may be a polyimide resin, polyamide-imide resin, polyester imide resin, or another resin used for industrial purposes. Examples include resin coatings for polyamide-imide enameled wires and resin coatings for polyimide enameled wires.

The Solvents of resin coatings include N-methyl-2-pyrrolidone (referred to below as NMP), dimethylformamide, dimethylacetamide, sulfolane, anisole, dioxolane, butyl cellosolve acetate, and lactone. Although these solvents can be used alone, two or more of the solvents may be mixed.

Phenyl triethoxysilane or phenyl trimethoxysilane are preferable as phenyl trialkoxysilane dispersed in this resin coating. When one of these phenyl trialkoxysilane compounds is used, silanol is produced as a result of hydrolysis that occurs in the process of manufacturing the insulation coating for electric wires, and thereby polycondensation is likely to occur. Accordingly, the dielectric constant can be reduced without degrading the heat resistance of the resin coating made from polyimide resin or polyamide-imide resin.

The insulation coating for electric wires according to the present invention is obtained by dispersing phenyl trialkoxysilane and pure water in the resin coating; the phenyl trialkoxysilane is mixed 3 to 100 parts by weight to the constituent resin of 100 parts by weight in the resin coating. If the ratio by which phenyl trialkoxysilane is included is less than 3 parts by weight, the dielectric constant is not adequately lowered, so an effect of improving deterioration due to partial discharges is inadequate. If the ratio by which phenyl trialkoxysilane is included is more than 100 parts by weight, dispersion becomes less likely to occur and thus the stability of the insulation coating is reduced, worsening, e.g., flexibility.

(Electric Insulated Wire)

The electric insulated wire according to the present invention is obtained by applying an insulation coating for electric wires to an electric conductor directly or through an insulation layer made from another organic insulation coating and by baking the insulation coating, the insulation coating being obtained by dispersing phenyl trialkoxysilane and pure water in the resin coating, the phenyl trialkoxysilane being included 3 to 100 parts by weight for the constituent resin of 100 parts by weight in the resin coating.

A copper wire, an aluminum wire, a silver wire, a nickel wire, or the like can be used as the electric conductor. The electric conductor may have a round or rectangular shape, for example.

To further improve adhesion as necessary, a silane coupling agent may be added to the resin coating. Alternatively, a silane coupling agent may be applied to the electric conductor and baked to form a film, and an insulation film made of the above insulation coating for electric wires may be formed around the film. Although there are no restrictions on the silane coupling agent, preferable examples include 3-glycidoxy propyl trimethoxy silane, 3-methacryloxy propyl trimethoxy silane, 3-acryloxy propyl trimethoxy silane, 3-amino propyl trimethoxy silane, 3-amino propyl triethoxy silane, N-2-(aminoethyl)-3-amino propyl trimethoxy silane, and 3-mercapto propyl trimethoxy silane. Furthermore, to improve workability in the process of forming coils, a lubricant layer may be formed as the outermost layer of the electric insulated wire, as necessary.

As described above, the present invention relates to an electric insulated wire formed by applying an insulation coating for electric wires to an electric conductor directly or through an insulation layer made from another organic insulation coating and by baking the insulation coating, the insulation coating being obtained by dispersing phenyl trialkoxysilane and pure water in a resin coating, the phenyl trialkoxysilane being included 3 to 100 parts by weight for a constituent resin of 100 parts by weight in the resin coating. The electric insulated wire can achieve high adhesion between the resulting insulation coating layer and electric conductor, and have a low dielectric constant, while the electric insulated wire is superior in suppression of corona discharge generation and dielectric breakdown prevention characteristics, and is preferable for use as coils particularly in motors and transformers.

EXAMPLES

Specific examples will be described below. However, the present invention is not limited to the specific examples described herein.

Example 1

To obtain an insulation coating for electric wires of Example 1, 5.0 grams of phenyl triethoxysilane and 1.1 grams of pure water were mixed with 100 grams of polyamide-imide coating with a solid concentration of 20 mass % and the resulting mixture was stirred. To manufacture an electric insulated wire, the insulation coating for electric wires of Example 1 was applied around a round copper electric conductor and then was baked to form an insulation film with a thickness of 30 μm as an outer layer.

Example 2

To obtain an insulation coating for electric wires of Example 2, 5.0 grams of phenyl triethoxysilane and 1.1 grams of pure water were mixed with 100 grams of polyimide coating with a solid concentration of 20 mass % and the resulting mixture was stirred. To manufacture an electric insulated wire, the insulation coating for electric wires of Example 2 was applied around a round copper electric conductor and then was baked to form an insulation film with a thickness of 30 μm as an outer layer.

Example 3

To obtain an insulation coating for electric wires of Example 3, 5.0 grams of phenyl trimethoxysilane and 1.1 grams of pure water were mixed with 100 grams of polyamide-imide coating with a solid concentration of 20 mass % and the resulting mixture was stirred. To manufacture an electric insulated wire, the insulation coating for electric wires of Example 3 was applied around a round copper electric conductor and then was baked to form an insulation film with a thickness of 30 μm as an outer layer.

Example 4

To obtain an insulation coating for electric wires of Example 4, 5.0 grams of phenyl trimethoxysilane and 1.1 grams of pure water were mixed with 100 grams of polyimide coating with a solid concentration of 20 mass % and the resulting mixture was stirred. To manufacture an electric insulated wire, the insulation coating for electric wires of Example 4 was applied around a round copper electric conductor and then was baked to form an insulation film with a thickness of 30 μm as an outer layer.

Example 5

To obtain an insulation coating for electric wires of Example 5, 0.6 grams of phenyl triethoxysilane and 0.02 grams of pure water were mixed with 100 grams of polyamide-imide coating with a solid concentration of 20 mass % and the resulting mixture was stirred. To manufacture an electric insulated wire, the insulation coating for electric wires of Example 5 was applied around a round copper electric conductor and then was baked to form an insulation film with a thickness of 30 μm as an outer layer.

Example 6

To obtain an insulation coating for electric wires of Example 6, 20 grams of phenyl triethoxysilane and 0.02 grams of pure water were mixed with 100 grams of polyamide-imide coating with a solid concentration of 20 mass % and the resulting mixture was stirred. To manufacture an electric insulated wire, the insulation coating for electric wires of Example 6 was applied around a round copper electric conductor and then was baked to form an insulation film with a thickness of 30 μm as an outer layer.

Comparative Example 1

To manufacture an electric insulated wire of Comparative example 1, a polyamide-imide coating was applied around a round copper electric conductor and then was baked to form an insulation film with a thickness of 30 μm as an outer layer.

Comparative Example 2

To manufacture an electric insulated wire of Comparative example 2, a polyimide coating was applied around a round copper electric conductor and then was baked to form an insulation film with a thickness of 30 μm as an outer layer.

Comparative Example 3

To obtain an insulation coating for electric wires of Comparative example 3, 0.1 grams of phenyl triethoxysilane and 0.02 grams of pure water were mixed with 100 grams of polyamide-imide coating with a solid concentration of 20 mass % and the resulting mixture was stirred. To manufacture an electric insulated wire, the insulation coating for electric wires of Comparative example 3 was applied around a round copper electric conductor and then was baked to form an insulation film with a thickness of 30 μm as an outer layer.

Comparative Example 4

Although 25.0 grams of phenyl triethoxysilane and 6.7 grams of pure water were mixed with 100 grams of polyamide-imide coating with a solid concentration of 20 mass % and the resulting mixture was stirred, a gel was formed, and a suitable coating for enameled wires could not be obtained.

Comparative Example 5

Although 30.0 grams of phenyl triethoxysilane and 6.7 grams of pure water were mixed with 100 grams of polyamide-imide coating with a solid concentration of 20 mass % and the resulting mixture was stirred, a gel was formed, and a suitable coating for enameled wires could not be obtained.

Table 1 shows the evaluation results of the insulation coatings for electric wires and the electric wires in Examples 1 to 6 and Comparative examples 1 to 5.

TABLE 1

| | | Examples | | | | | | Comparative examples | | | | |
|---|---|---|---|---|---|---|---|---|---|---|---|---|
| | | 1 | 2 | 3 | 4 | 5 | 6 | 1 | 2 | 3 | 4 | 5 |
| Constituents of insulation coating (g) | Polyamide-imide coating | 100 | | 100 | | 100 | 100 | 100 | | 100 | 100 | 100 |
| | Polyimide coating | | 100 | | 100 | | | | 100 | | | |
| | Phenyl triethoxysilane | 5 | 5 | | | 0.6 | 20 | | | 0.1 | 25 | 30 |
| | Phenyl trimethoxysilane | | | 5 | 5 | | | | | | | |
| | Pure water | 1.1 | 1.1 | 1.1 | 1.1 | 0.02 | 0.02 | | | 0.02 | 6.7 | 6.7 |
| Ratio (parts by weight) of phenyl triethoxysilane or phenyl trimethoxysilane to constituent resin of 100 parts by weight in resin coating | | 25 | 25 | 25 | 25 | 3 | 100 | 0 | 0 | 0.5 | 125 | 150 |

TABLE 1-continued

|  |  | Examples | | | | | | Comparative examples | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Characteristics | (1) Stability of insulation coating | ◯ | ◯ | ◯ | ◯ | ◯ | ◯ | ◯ | ◯ | ◯ | X*1 | X*2 |
|  | (2) 5% weight reduction temperature (° C.) | 462 | 483 | 475 | 470 | 480 | 475 | 432 | 442 | 445 | 480 | — |
|  | (3) Flexibility | ◯ | ◯ | ◯ | ◯ | ◯ | ◯ | ◯ | ◯ | ◯ | X | — |
|  | (4) Adhesion (N/10 mm) | 1.6 | 1.8 | 1.7 | 1.8 | 1.6 | 1.6 | 1.6 | 1.6 | 1.6 | 1.2 | — |
|  | (5) Dielectric constant (1 MHz) | 2.7 | 2.9 | 2.7 | 2.7 | 2.9 | 2.6 | 3.8 | 3.8 | 3.3 | 2.9 | — |
|  | (6) Dielectric breakdown voltage (kV/mm) | 516 | 522 | 513 | 512 | 522 | 521 | 477 | 485 | 462 | 516 | — |

*1Resin coating changed to a gel 10 days later.
*2Insulation coating could not be obtained.

The characteristics in Table 1 were evaluated for each example, as described below.

(1) Stability of Insulation Coating for Electric Wires:

The insulation coating for electric wires was placed in a room not exposed to direct sunlight for one month at 30° C., and stability was evaluated on the basis of presence or absence of the constituent resin and/or hollow silica settled in the varnish. When there was no change in the insulation coating after one month, symbol "◯" was denoted in Table 1.

(2) 5% Weight Reduction Temperature:

A test film with a weight of 10 mg was prepared from the obtained insulation coating. The test film was placed in a sample pan. The thermo-gravimetric/differential thermal analyzer TG/DTA 320 from Seiko Instruments Inc. was used to thermally analyze the test film in the air, at a flow rate of 100 ml/minute, at a temperature rise rate of 10° C./minute, in a temperature range from room temperature to 800° C. A temperature at which the test film weight was reduced by 5% was defined as the 5% weight reduction temperature.

(3) Flexibility:

A test strip formed in a film shape (25 micron thickness), with a size of 2 mm by 100 mm, was repeatedly bent through 180 degrees 10 times, after which the test strip was checked for cracks. When no cracks were observed, symbol "◯" was denoted in Table 1. When cracks were observed after the test, symbol "x" was given.

(4) Adhesion:

The insulation coating for electric wires was applied to a copper substrate and then baked for use in the adhesion evaluation. The adhesion of a test strip with a width of 10 mm was evaluated by measuring its tensile strength with a universal material testing instrument (Tensilon type).

(5) Dielectric Constant:

The dielectric constant of a test strip formed in a film shape (25 micron thickness), with a size of 2 mm by 100 mm, was measured at 10 GHz by the cavity resonator perturbation method using S-parameter Network Analyzer 8720ES from Agilent Technologies Japan, Ltd.

(6) Dielectric Breakdown Voltage:

An insulation film was caught between brass disk electrodes with a diameter of 30 mm, which was disposed in parallel. A voltage of 1 kV was applied across the electrodes and then it was raised at a rate of 0.5 kV/minute to measure the voltage at which a breakdown occurred.

As seen from Table 1, the insulation coatings in Examples 1 to 6 and Comparative examples 1 and 2 exhibited equivalent stability, flexibility, and adhesion to the electric conductor, indicating that characteristics of insulation films made from a polyamide-imide resin coating or polyimide resin coating are maintained.

The dielectric constant in Examples 1 to 6 was lower than that in Comparative examples 1 and 2 (prior art), providing an insulation coating with a low dielectric constant while characteristics of insulation films made from a polyamide-imide resin coating or polyimide resin coating are maintained. In addition, the 5% weight reduction temperature and dielectric breakdown voltage in Examples 1 to 6 were higher than those in Comparative examples 1 and 2 (prior art), indicating that resistance to heat and dielectric breakdown prevention characteristics were improved.

In Comparative example 3, on the other hand, the ratio by which phenyl trialkoxysilane is included for the constituent resin of 100 parts by weight in the resin coating is less than 3 parts by weight, so an insulation film with a low dielectric constant was not obtained. The insulation film obtained in Comparative example 3 exhibited equivalent or inferior dielectric breakdown prevention characteristics, when compared with Comparative examples 1 and 2 (prior art).

In Comparative examples 4 and 5, the stability of the insulation coating was poor. Particularly, in Comparative example 4, the adhesion to the electric conductor was poorer than that in the prior art. In Comparative example 5, an insulation coating could not be obtained. A possible reason for this is that the ratio by which phenyl trialkoxysilane is included for the constituent resin of 100 parts by weight in the resin coating was excessively increased. Therefore, it is considered that the ratio by which phenyl trialkoxysilane is included for the constituent resin of 100 parts by weight in the resin coating is preferably 100 parts by weight or less.

In these Examples, the insulation coating for electric wires, which was obtained by dispersing phenyl trialkoxysilane and pure water in the resin coating made from polyimide resin or polyamide-imide resin, the phenyl trialkoxysilane being included 3 to 100 parts by weight for the constituent resin of 100 parts by weight in the resin coating, was applied directly to an electric conductor and then was baked. However, even when an insulation layer made from another organic insulation coating intervenes, the same effect is obtained. If a film is formed by applying a silane coupling agent to the electric conductor and then an insulation film is formed on the silane coupling film by applying the insulation coating for electric wires according to the present invention and by baking the insulation coating, then not only the above characteristics are obtained but also the adhesion can be further improved.

If, in the embodiment of the present invention, a lubricant layer is formed around an outer circumference or outermost layer of the insulation layer, then not only the above characteristics are obtained but also the lubrication of the enameled wire can be improved.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An insulation coating for electric wires, comprising a resin coating made from polyimide resin or polyamide-imide resin as a constituent resin, the insulation coating being formed by dispersing phenyl trialkoxysilane and pure water in the resin coating, wherein:

the phenyl trialkoxysilane is included 3 to 100 parts by weight for the constituent resin of 100 parts by weight in the resin coating.

2. The insulation coating for electric wires according to claim 1, wherein:

the phenyl trialkoxysilane is phenyl triethoxysilane or phenyl trimethoxysilane.

3. An electric insulated wire comprising an electric conductor and an insulation film, wherein:

the insulation film is formed by applying the insulation coating for electric wires according to claim 2 to the electric conductor directly or through an insulation layer made from another organic insulation coating and by baking the insulation coating.

4. The electric insulated wire according to claim 3, wherein:

the insulation film is formed on a film comprising a silane coupling agent preformed on the electric conductor.

5. An electric insulated wire comprising an electric conductor and an insulation film, wherein:

the insulation film is formed by applying the insulation coating for electric wires according to claim 1 to the electric conductor directly or through an insulation layer made from another organic insulation coating and by baking the insulation coating.

6. The electric insulated wire according to claim 5, wherein:

the insulation film is formed on a film comprising a silane coupling agent preformed on the electric conductor.

* * * * *